April 2, 1957 C. E. KERR 2,787,273
GREEN CORN CUTTING MACHINE
Filed May 13, 1955 5 Sheets-Sheet 1
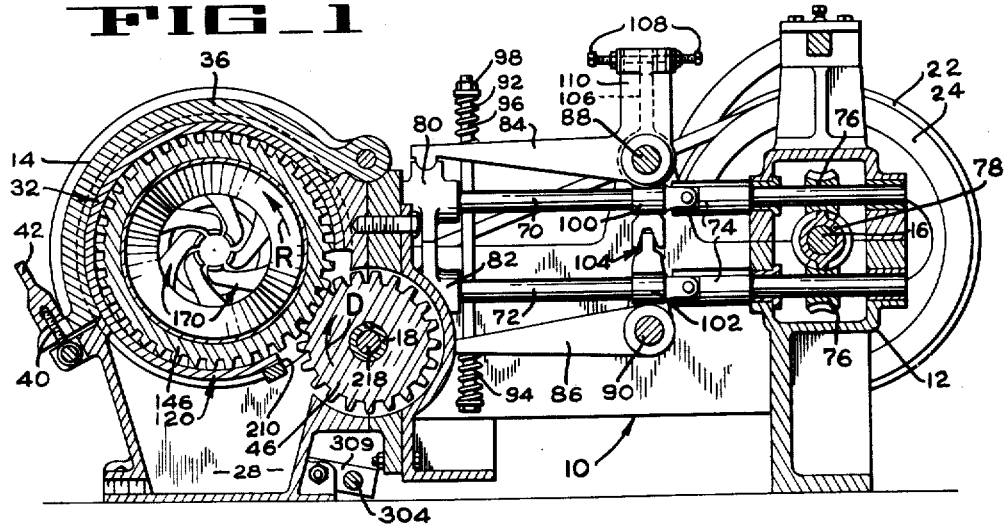
FIG_1
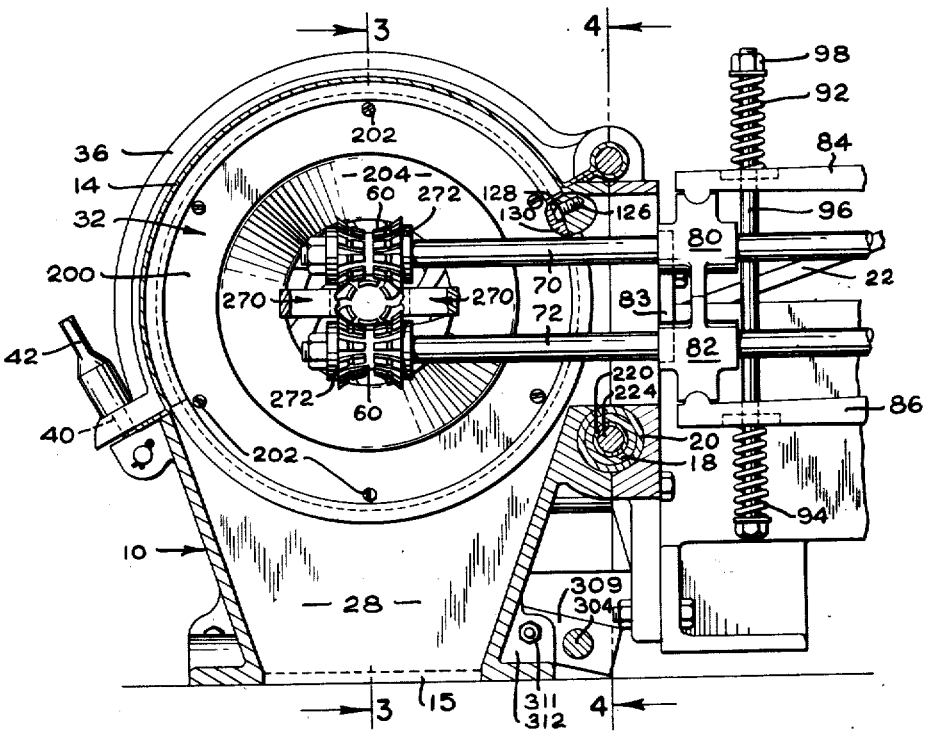
FIG_2
INVENTOR
CHARLES E. KERR
BY *Hans G. Hoffmeister*
ATTORNEY

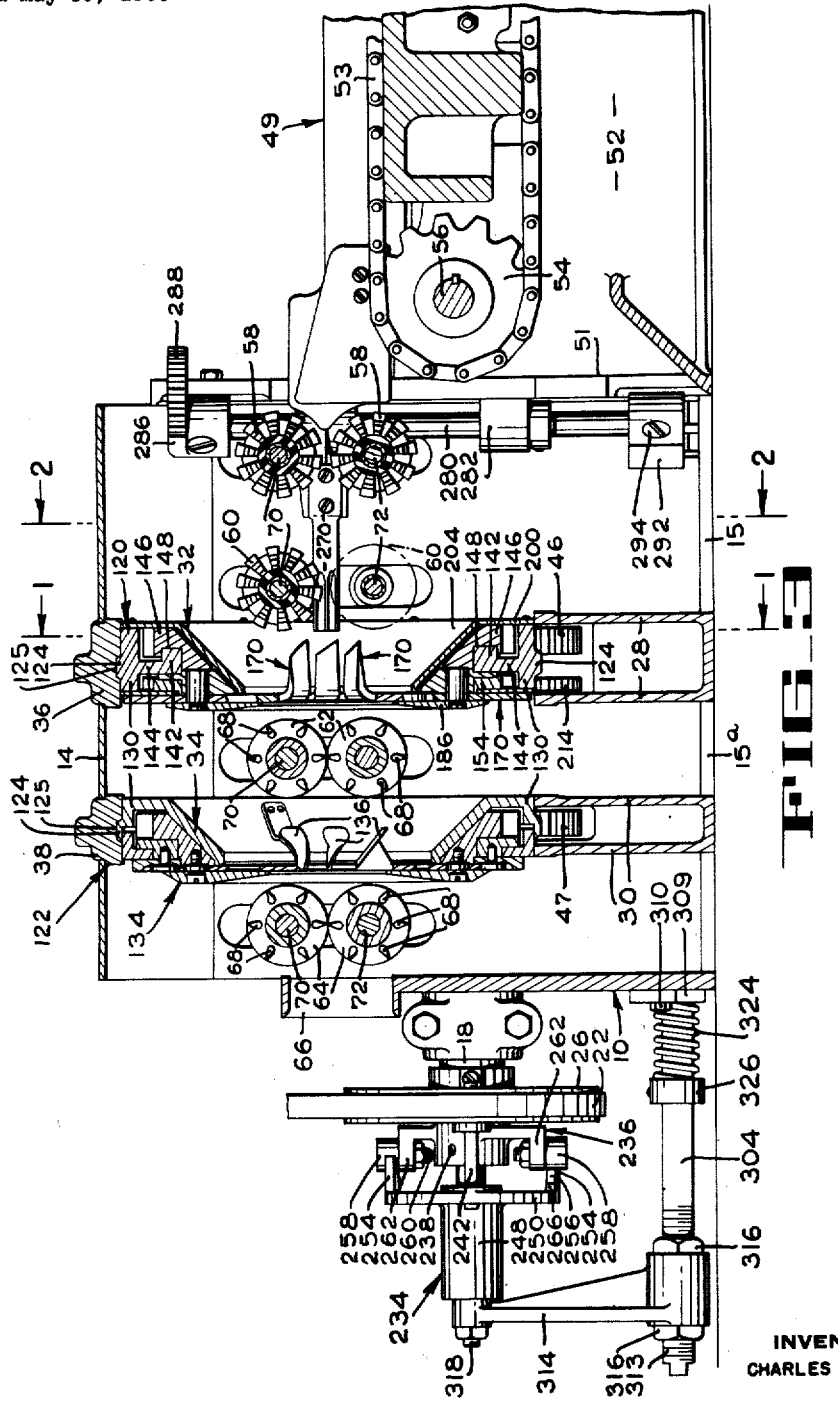

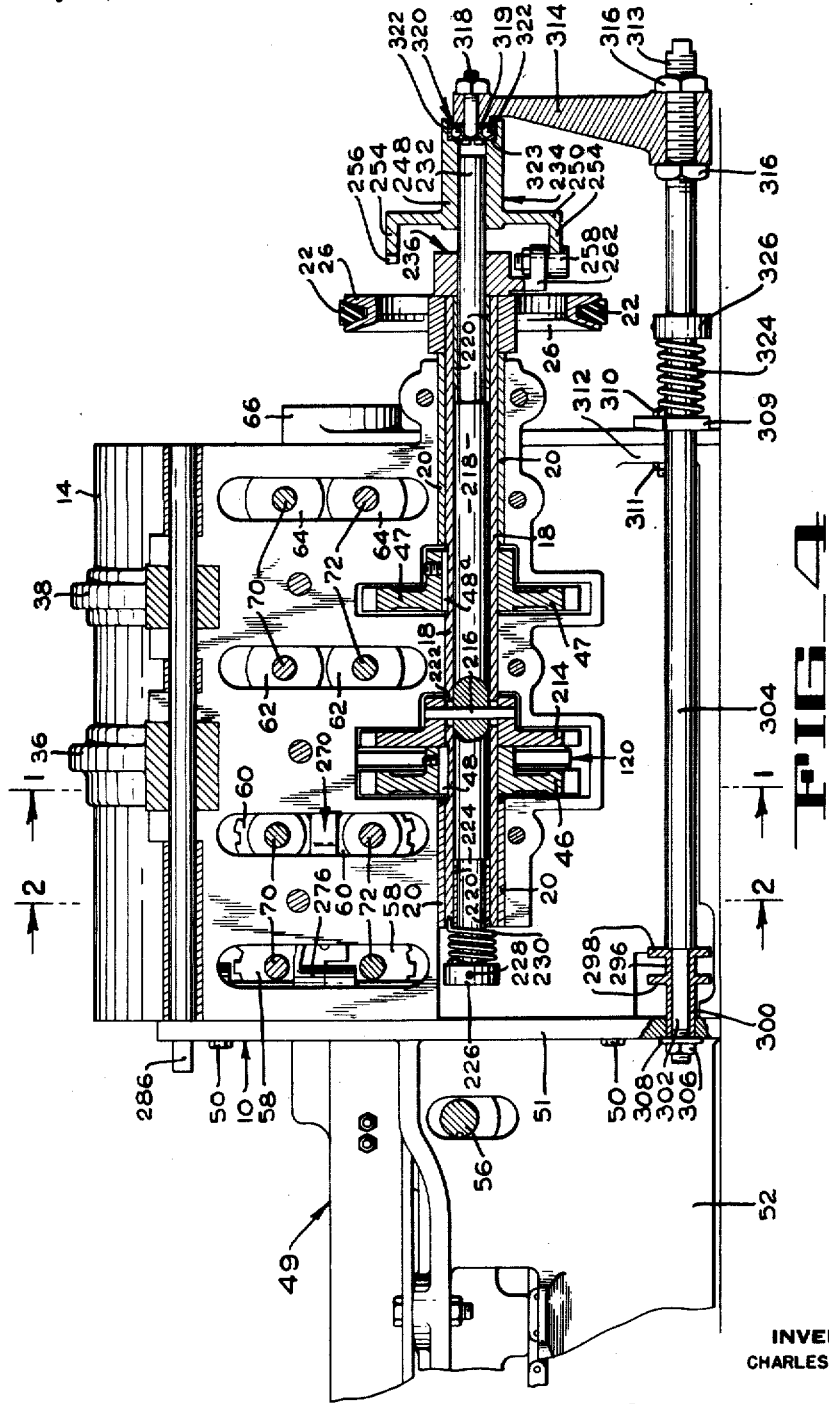

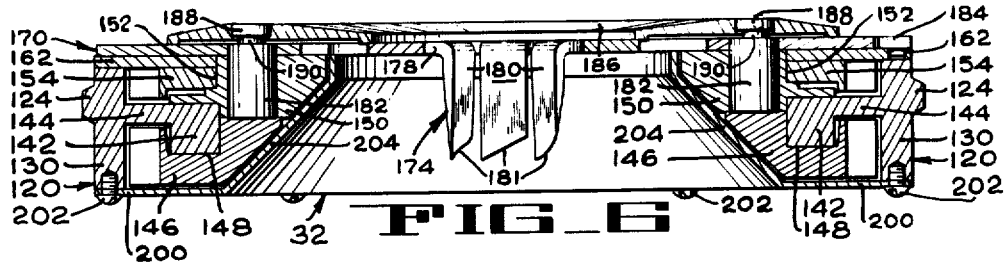
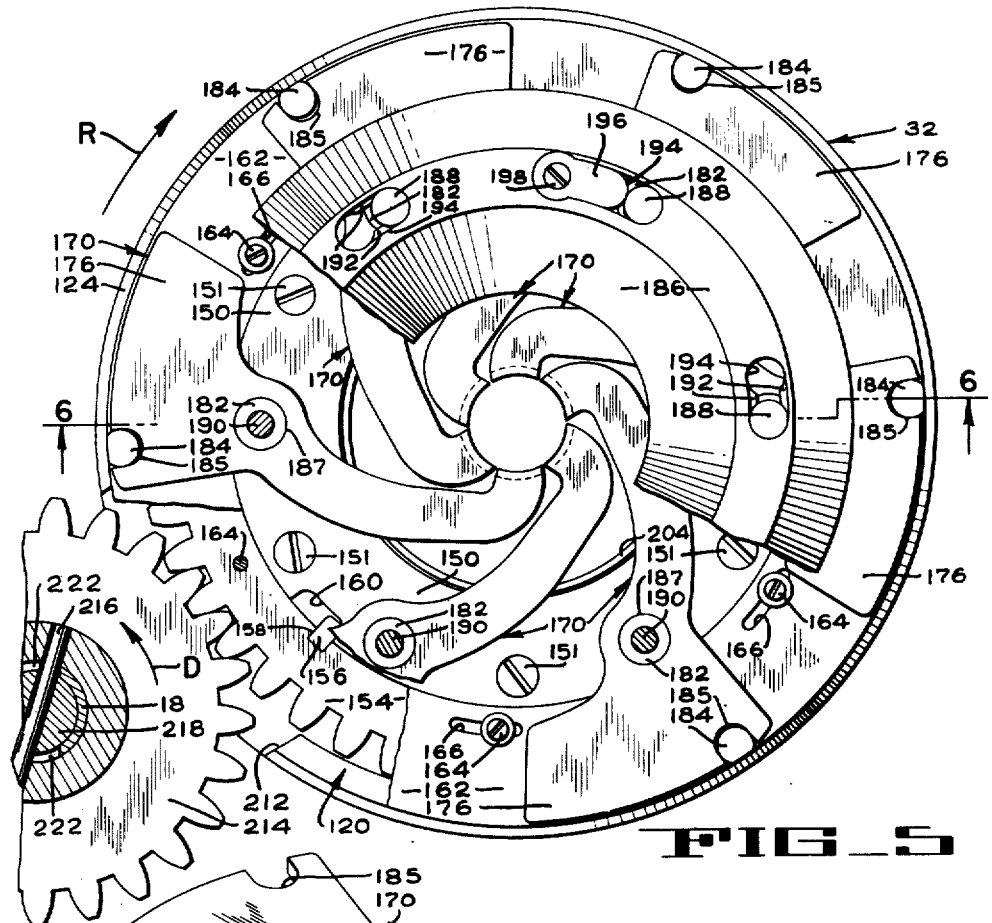
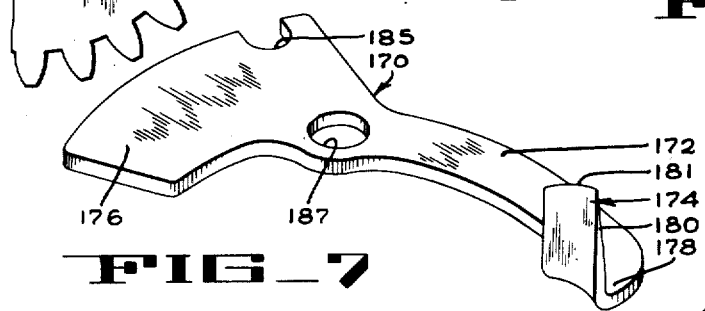

April 2, 1957
C. E. KERR
2,787,273
GREEN CORN CUTTING MACHINE
Filed May 13, 1955
5 Sheets-Sheet 5
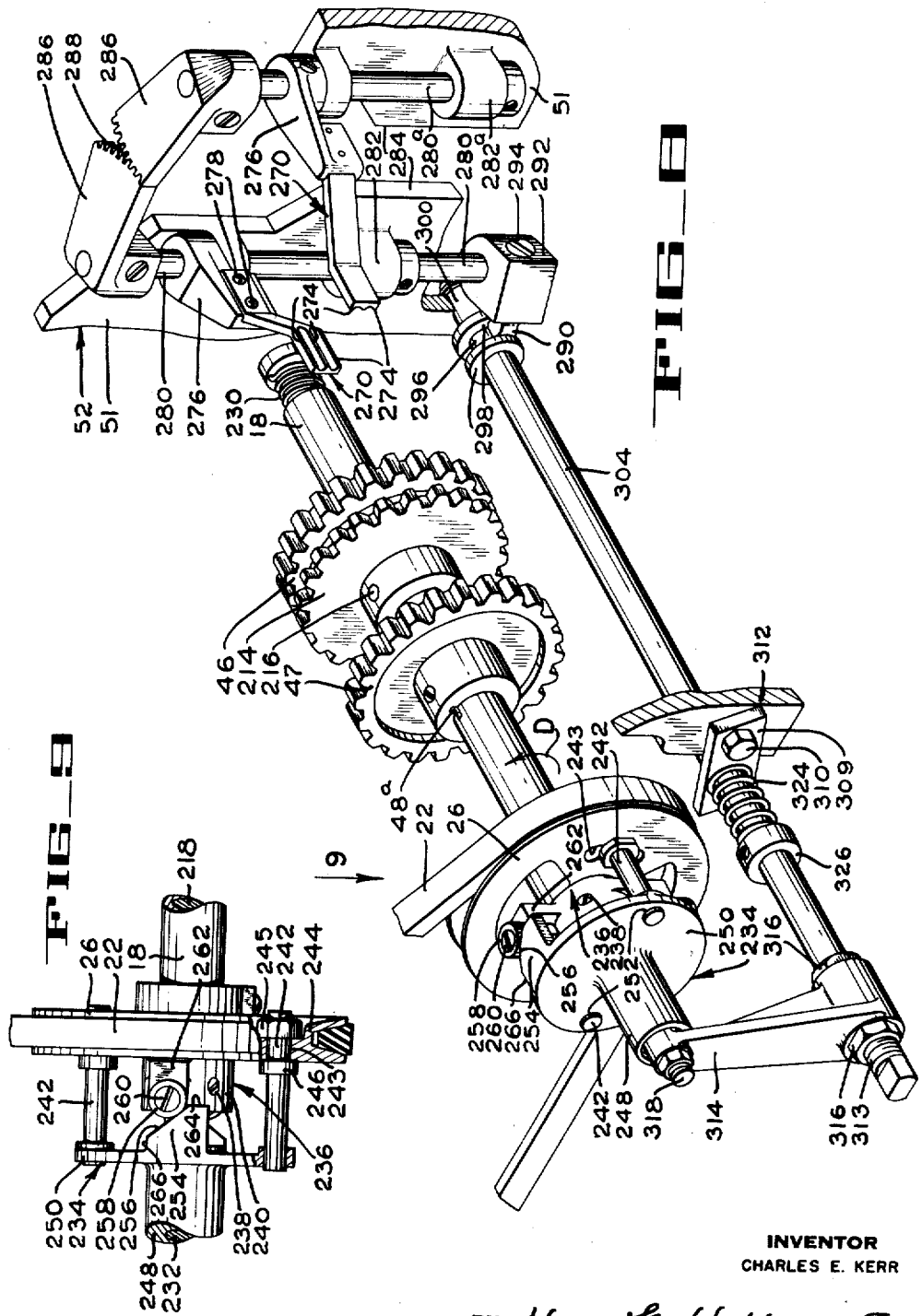
INVENTOR
CHARLES E. KERR
BY Hans G. Hoffmeister
ATTORNEY

United States Patent Office 2,787,273
Patented Apr. 2, 1957

2,787,273

GREEN CORN CUTTING MACHINE

Charles E. Kerr, Hoopeston, Ill., assignor to Food Machinery and Chemical Corporation, San Jose, Calif., a corporation of Delaware Application May 13, 1955, Serial No. 508,202

9 Claims. (Cl. 130—9)

This invention relates to green corn cutting machines of the type employing a rotary head equipped with adjustable knives for cutting the kernels from ears of corn passed through the head.

An object of the invention is to provide an improved green corn cutting machine of the rotary cutter type.

Another object is to provide a cutter head for a rotary corn cutting machine, incorporating improved mechanism for automatically adjusting the knives thereof in accordance with the size of an ear of corn being presented to the knives.

Another object is to provide an improved mechanism for gauging each ear of corn as the same approaches the rotating cutter head.

Another object is to provide an improved mechanism interconnecting the gauging mechanism and the adjustable knives, for adjusting the knives in response to actuation of the gauge by an ear of corn approaching or entering the cutter head.

Another object is to provide a mechanism for automatically adjusting the knives of a rotary corn cutter, whereby the knives are positively moved outward, or opened, against a yielding resistance which functions to take up any lost motion existing in the adjusting mechanism and/or in the mounting of the knives, and which, therefore, contributes to the promptness, accuracy, and dependability with which the knives respond to actuation of the gauging mechanism.

Other objects and advantages of the invention will become apparent from the following description and drawings, in which:

Fig. 1 is a transverse section through the corn cutting machine of the present invention, taken along lines 1—1 of Figs. 3 and 4.

Fig. 2 is an enlarged, fragmentary transverse section taken along lines 2—2 of Figs. 3 and 4, portions being broken away.

Fig. 3 is a longitudinal section of the machine taken along lines 3—3 of Fig. 2.

Fig. 4 is a section along lines 4—4 of Fig. 2.

Fig. 5 is an elevation of the cutting head and the driving means therefor viewed from the discharge side of the machine, certain parts being broken away.

Fig. 6 is a section of the cutting head taken along lines 6—6 of Fig. 5.

Fig. 7 is a perspective of one of the corn cutting knives.

Fig. 8 is a perspective of the mechanism for driving the cutting head and the mechanism for gauging the diameter of the ears of corn and correspondingly adjusting the cutting knives.

Fig. 9 is a structural detail, partly broken away, viewed as indicated by the arrow 9 of Fig. 8.

The present invention provides improvements over the corn cutting machine of U. S. Patent No. 2,323,092, issued June 29, 1943, to Charles E. Kerr, and since the construction and operation of the machine as a whole are fully illustrated and described in the patent, it will suffice for the purposes of the present disclosure to describe the features common to both, the machine to which the present invention has been applied and that of the patent referred to, with only that degree of particularity which is essential to a full understanding of the present invention.

Referring first to Fig. 1 of the drawings, the corn cutting machine comprises a frame 10 having a gear casing 12 at one side thereof and a housing 14 at its other side. A main drive shaft 16 is rotatably mounted in position extending longitudinally within the gear casing 12, and is driven from any suitable power source (not shown). An auxiliary drive shaft 18 (Figs. 1, 2, 4, 5, 8 and 9) which is of tubular form is journalled in bearings 20 (Figs. 2 and 4) supported from the frame 10. The auxiliary shaft 18 is driven by a belt 22 (Figs. 1, 3, 4, 8 and 9) trained around a driving pulley 24 on the main shaft 16 and around a driven pulley 26 (Figs. 3, 4, 8 and 9) on the auxiliary shaft 18 adjacent one end thereof.

The bottom of the housing 14 is provided with discharge openings 15 and 15a (Figs. 2 and 3) to permit the gravitational discharge of kernels of corn removed from the ears. Two spaced partitions 28 and 30 extend transversely of the housing 14 and support a rotary cutting head 32 and a rotary scraping head 34, respectively. The heads 32 and 34 are releasably secured in operative position by semi-circular clamps 36 and 38, respectively, (Figs. 1, 2, 3 and 4), each of which is normally held closed by a toggle bolt 40 and wing nut 42 (Figs. 1 and 2). The rotary heads 32 and 34 are driven by gears 46 and 47, respectively, which are secured to the auxiliary shaft 18 by keys 48 and 48a (Figs. 4 and 8). The direction of rotation of the heads 32 and 34 is clockwise as viewed from the discharge end of the machine, as indicated by the arrow R (Fig. 5), while the direction of rotation of the auxiliary drive shaft 18 is counterclockwise, as indicated by the arrows D (Figs. 5 and 8).

A feed trough 49 (Figs. 3 and 4) is secured to the front portion of the housing 14 by bolts 50 extending through a transverse web 51 of the frame 52 of the feed trough 49 into threaded engagement with the housing 14. An endless feed chain 53 within the feed trough 49 is trained around suitably mounted sprockets 54, only one of which is shown, and one of which is keyed to a drive shaft 56 operably connected to a conventional drive mechanism (not shown). The husked ears of corn are deposited end-to-end in the feed trough 49 and are advanced therealong by the feed chain 53 with their axis substantially in coincidence with the axis of rotation of the cutter and scraping heads 32 and 34. A pair of feed rollers 58 (Fig. 3) receives each ear of corn and feeds it into a second pair of feed rollers 60, the two pairs 58 and 60 of feed rollers being disposed to align, or to preserve the alignment of, the axis of the ear with that of the rotary heads 32 and 34 as the rollers 58 and 60 cooperate with each other in feeding the ear into the cutter head 32.

The feed rollers 58 and 60 are similar in construction and are spool-shaped so that they center an ear of corn passing between them. Traction with the ear is gained by making the rollers of rubber, and by cross-grooving the corn-engaging surfaces of the rollers 58 and 60, as more fully explained in the hereinabove mentioned patent.

As an ear of corn leaves the cutter head 32, the ear passes between a third pair of feed rollers 62 that advance each ear of corn to and through the scraping head 34 and to a fourth pair of feed rollers 64 by which the scraped cob is discharged from the machine through an outlet 66 whence the cob drops onto any suitable means for disposing of same, such as a discharge chute (not shown). The feed rollers 62 and 64 may be constructed of metal and preferably are provided with prongs or teeth 68 which penetrate the cobs and aid the feeding thereof.

The upper and lower feed rollers 58, 60, 62 and 64 of each pair are secured to upper and lower shafts 70 and 72, respectively, there being one such pair of shafts individual to each pair of rollers. Each shaft 70 and 72 is connected through a universal joint 74 (Fig. 1) to a worm gear 76 which is enmeshed with a driving worm 78 rigid with the main drive shaft 16. One such driving worm is provided for each pair of shafts 70, 72, the worm gears 76 of which engage the driving worm at opposite sides, so that the two shafts 70, 72 of each pair rotate in opposite directions. Hence, the feed rollers 58, 60, 62 and 64 cooperate with each other to advance the ears of corn successively from the feed trough 49, through the rotary heads 32 and 34, and through the outlet 66.

Each of the four pairs of feed rollers 58, 60, 62 and 64 is provided with means for resiliently pressing the respectively associated upper and lower rollers toward each other. Each pair of rollers is likewise provided with means interconnecting the associated upper and lower rollers for equalized, opposite movement. Since these means employed for each pair of rollers is identical with those employed for each of the other pairs, a description of the pressing means and the equalizing means for one pair of rollers will suffice. For example, the shafts 70 and 72 of the second pair of feed rollers 60 are rotatable in upper and lower bearing blocks 80 and 82, respectively (Figs. 1 and 2), which are guided in and restricted to vertical sliding movement in a channel 83 in the housing 14. Upper and lower equalizing arms 84 and 86 are pivoted, respectively, on shafts 88 and 90 which are rigidly mounted on the frame 10. The outer ends of the arms 84 and 86 bear against the bearing blocks 80 and 82, so as to press the blocks toward each other by force derived from springs 92 and 94 which encircle a tension rod 96 and each of which is under compression between one of the equalizing arms and a nut 98 on the associated end portion of the rod 96. Accordingly, the springs 92 and 94 continuously urge the feed rollers 60 toward each other to effect engagement of the same with an ear of corn with adequate pressure to ensure advance of the ear in response to rotation of the rollers.

The mechanism that interconnects the feed rollers 60 for equalized movement in opposite directions (Fig. 1) includes arms 100 and 102 extending toward each other from the upper and lower shafts 88 and 90, respectively. These two arms 100 and 102 are interengaged by a tooth and notch arrangement 104 whereby rotary motion of the one about the axis of its supporting shaft effects simultaneous and corresponding rotary motion of the other about the axis of its supporting shaft. Whereas the lower arm 102 is integral with the lower equalizing arm 86, the upper arm 100 is pivotally mounted on the shaft 88 independently of the upper equalizing arm, but is adjustably connected thereto by a lever 106 integral with the arm 100 and extending upward from the shaft where it is engaged between opposed adjusting screws 108 carried by an upwardly extending lever 110 integral with the upper equalizing arm 84. By manipulation of the adjusting screws 108, the angular position of the upper equalizing arm 84 relatively to the lever 106 can be adjusted, and consequently the two feed rollers can be adjusted to positions wherein they are equidistant from the horizontal axis of rotation of the heads 32 and 34.

In view of the fact that all the upper feed rollers 58, 60, 62 and 64 are rotated in one direction while all of the lower feed rollers are rotated in the opposite direction, an ear of corn delivered to the first pair of rollers 58 will be advanced thereby to the second pair 60, which will pass the ear through the cutter head 32 to the third pair of rollers 62, and these will, in turn, pass the ear through the scraping head 34 to the last pair of rollers 64, which discharge the scraped cob through the outlet 66.

Since the equalizer arms 84 and 86 associated with each pair of feed rollers are interconnected as above described, the rollers of each pair will be thrust apart by each ear of corn as the ear enters between the two opposed rollers, the amount of such yielding movement depending upon the diameter of the ear. Furthermore, the opposite rollers of each pair will always be disposed at equal distances above and below the axis of rotation of the heads 32 and 34, so that each ear of corn during its travel through the machine is maintained in coaxial alignment with the heads 32 and 34, thus assuring cutting and scraping of the ear to the same depth, throughout the entire circumferential extent of the same.

As mentioned previously herein, the mounting of the rotary heads 32 and 34 on the partitions 28 and 30, respectively, is such that either or both heads 32, 34 is readily demountable. Toward this end, each head 32, 34 includes an annular bearing member 120, 122, respectively (Figs. 3, 5 and 6) the outer circumferential surface of which is so fitted to the associated partition 28 or 30 and clamp 36 or 38 that when the head is in position on its supporting partition and the associated clamp is tightened the bearing member is immobilized within the machine. An annular bead 124 on each bearing member 120, 122 seats within a groove 125 (Fig. 3) in the inner surface of the clamp 36, 38, and thereby aids in securing the head 32, 34 against axial displacement; and the head of a screw 126 (Fig. 2) threaded into the housing 14 is engaged within a complementary socket 128 in the rim 130 of each bearing member to secure the same against rotational movement about its own axis.

The mechanism 134 of the scraping head 34, which includes scraping knives 136 (Fig. 3), is driven by the gear 47 which, as hereinbefore mentioned, is secured to the auxiliary drive shaft 18. However, inasmuch as the scraping head 34 is constructed the same, and operates in the same manner, as the scraping head illustrated and described in Patent No. 2,323,092 hereinabove referred to, and since the present invention is not concerned with the construction and operation of the scraping head, a detailed description of the scraping head is not necessary for a full understanding of the present invention.

Referring now to Figs. 3, 5 and 6, the bearing member 120 of the cutter head 32 is provided with an internal annular flange 142 concentric with the rim 130 of the bearing member 120 and spaced radially inward thereof by a web 144. The flange 142 provides a circular guide track for a driven gear 146 that is freely rotatable within the bearing member 120. This gear 146 is provided in one lateral face thereof with an annular groove 148 within which one side of the flange 142 is disposed with a running fit. An annular plate 150 affixed to the gear 146 by screws 151 (Fig. 5) slidably engages the opposite side of the flange 142, with the result that the flange 142 is slidably embraced between the gear 146 and the plate 150, which are rotatable in unison within the bearing member 120.

The plate 150 is formed with an annular recess 152 to accommodate a knife adjusting gear 154 of the same pitch diameter as the gear 146. Since the gear 154 is fitted to the plate 150 with a running fit, the adjusting gear 154 is free to rotate with respect to the gear 146, but the extent of such relative rotation is limited by a key 156 (Fig. 5) seated tightly within a keyway 158 in the adjusting gear 154 and extending loosely into a circumferentially elongated recess 160 in the plate 150. A knife adjusting ring 162 is secured tto the adjusting gear 154 by screws 164 (Fig. 5), each of which extends through a clearance hole 166 in the ring 162 into threaded engagement with the rim of the gear 154. Each of the clearance holes 166 is elongated in an arc concentric with respect to the ring 162 and gear 154 so that by loosening all the screws 164, the adjusting ring 162 is rotationally adjustable on the gear 154 through an angular distance limited by the length of the holes 166.

A plurality of knives 170 are disposed in engagement with radial faces of the annular plate 150 and the adjusting ring 162. The knives 170 are arranged in a circular pattern and are equally angularly spaced about the axis of rotation of the head 32. As best shown in Fig. 7, each knife 170 comprises a substantially radially extending shank 172, a blade 174 at the inner end of the shank and a counterweight 176 at the outer end of the shank. The blade 174 is of two parts, i. e., a portion 178 in the plane of and extending laterally from the shank and a portion 180 extending approximately perpendicularly from the portion 178 and consequently axially of the head 32. The portion 180 is arcuate (Fig. 5) about a center lying in or adjacent the axis of the head 32, and is sharpened to a cutting edge 181 (Figs. 3, 4 and 7). Each knife 170 is pivoted adjacent the outer end of its shank 172 on a stud pin 182 rigid with the annular plate 150, and the counterweight 176 extends laterally from the same side of the shank 172 as the portion 178 of the blade 174. Therefore, when the head 32 is rotated, the centrifugal force exerted on the several counterweights 176 urges the knives 170 to rotate about their stud pins in the direction in which the blades move radially inward toward the axis of rotation, iris fashion. The knives 170 are adapted to be positively rotated in the opposite direction, against the action of centrifugal force exerted on the counterweights, by adjusting pins 184 rigid with the adjusting ring 162 and freely disposed in notches 185 in the outer ends of the shanks 172 of the knives 170. Thus, when the adjusting gear 154 and the ring 162 are turned clockwise (Fig. 5) with respect to the gear 146 and the annular plate 150, the knives 170 are simultaneously and coextensively swung radially outward to an expanded position.

When assembling the cutter head, the knives 170 should be set in their positions of minimum knife opening. This is accomplished after the knives have been placed in position upon the adjusting ring 162 and annular plate 150, with the stud pins 182 extending through the holes 187 provided for the purpose in the shanks 172 of the knives, and with the adjusting pins 184 engaged within the notches 185. Shifting the adjusting ring 162 on the gear 154 while the screws 164 are loose, effects adjustment of the knives 170 to their optimum setting, after which the screws 164 should be securely tightened, to preserve the adjustment.

The adjusting gear 154, the ring 162 and the several knives 170 are retained in their respective positions relative to the plate 150 and the gear 146 by a retaining ring 186 secured to the stud pins 182. Each stud pin 182 is formed with a head 188 at its outer end, connected to the body of the stud pin by a shank 190 of lesser diameter (Fig. 6). The heads 188 bear against depressed shoulders 192 extending inward from the lateral edges of arcuate slots 194 formed in the retaining ring 186. The shoulders 192 are shorter than the slots 194, and by rotating the retaining ring 186 clockwise (Fig. 5) with respect to the other portions of the head 32, the shoulders 192 may be withdrawn from under the heads 188, thus permitting removal of the ring 186. A spring bolt 196 removably secured within one of the arcuate slots 194 by a screw 198, in position abutting against the head 188 of the associated stud pin 182, prevents accidental shifting of retaining ring 186 from the position in which it is securely locked upon the stud pins 182.

From the foregoing it is apparent that the gear 146, annular plate 150, stud pins 182 and retaining ring 186 are rotatable as a unit within the bearing member 120, carrying with them the knives 170 which are rotationally adjustable about their supporting stud pins 182 in response to shifting of the adjusting ring 162. Since the adjusting ring 162 is secured to the adjusting gear 154, the knives will remain in a given setting so long as the two gears 146 and 154 rotate together, but when the adjusting gear 154 is shifted clockwise (Fig. 5) with respect to the gear 146 (and consequently with respect to the stud pins 182) the knives 170 are adjusted to a more widely opened position.

The cutter head 32 is completed by a shielding plate 200 (Figs. 3 and 6) secured by screws 202 to the annular forward edge of the rim 130 of the bearing member 120. The plate 200 has a frusto-conical central portion 204 providing a tapered entrance throat to the cutter head 32, and shielding the internal mechanism of the same from kernels and juices of corn during operation of the machine.

Two similar openings 210 (Fig. 1) and 212 (Fig. 5) are provided in the annular bearing member 120 in corresponding positions in the circumference thereof. The gear 46 which, as hereinbefore mentioned, is secured to the tubular auxiliary drive shaft 18, extends through the opening 210 (Fig. 1) into meshing engagement with the driven gear 146 of the cutter head 32, to effect rotation of the gear 146 upon rotation of the shaft 18. In this manner the moving parts of the cutter head 32 are rotated clockwise (Fig. 5) within the bearing member 120 to draw or whirl the knives 170 around an ear of corn as the same is advanced through the cutter head by the feed rollers 60 and 62.

A gear 214 (Figs. 3, 4, 5 and 8) whose diameter is same as that of the gear 46, extends through the opening 212 of the annular bearing member 120, into meshing engagement with the knife adjusting gear 154 within the cutter head 32. The gear 214 is mounted on the tubular shaft 18 for free rotary motion with respect thereto, and is rigidly secured by a pin 216 (Figs. 4 and 8) to a shaft 218 that is rotatably supported within the bore of the tubular shaft 18 by bushings 220 (Figs. 2 and 4). The pin 216, while rigid with both the gear 214 and the inner shaft 218, extends through suitable clearance holes 222 in the tubular shaft, which permit rotational adjustment of the inner shaft 218 and the gear 214 with respect to the tubular shaft 18.

An extension 224 (Fig. 4) of the inner shaft 218 protrudes beyond one end of the tubular shaft 18 and a collar 226 is rigidly secured thereto by a pin 228. A torsion spring 230 (see also Fig. 8) coiled around the shaft extension 224 is secured at one end to the collar 226 and at the other end to the tubular shaft 18. The spring 230 is so stressed that it continuously urges the inner shaft 218 and the gear 214 to rotate clockwise (Fig. 5) with respect to the tubular shaft 18, and thus continuously spring loads the knife adjusting gear 154, urging rotation of the same relatively to the gear 146 in the direction which is conductive to closing of the knives (see Fig. 5). It is apparent, therefore, that the torsion spring 230 cooperates with the counterweights 176 which as previously explained, are actuated by centrifugal force to urge the knives to their position of minimum spacing.

An extension 232 (Fig. 4) of the shaft 218 at the other end thereof provides support for a bracket 234 in a position spaced from the pulley 26 which is mounted on the adjacent end of the tubular shaft 18. A second bracket 236 is rigidly secured to the shaft extension 232 between the bracket 234 and the pulley 26, as by a setscrew 238 (Fig. 9) extending through the hub 240 of the bracket 236 and into engagement with a key (not shown) interconnecting the hub 240 and the shaft extension 232 in the conventional manner.

The bracket 234 is freely slidable and rotatable on the shaft extension 232, but is connected to the pulley 26 for rotation therewith by a sliding connection which permits axial movement of the bracket 234 toward and away from the pulley 26. This sliding connection comprises two pins 242 each of which extends through an opening 243 (Figs. 8 and 9) in the web 244 of the pulley 26 to receive a nut 245 which, when tightened, draws a shoulder 246 of the pin tightly against the web 244 to secure the pin rigidly to the pulley 26. When so mounted, the pins 242 extend laterally from the pulley parallel to the axis of rotation thereof. The two openings 243 are formed in the web 244 in diametrically opposed relation, and each is elongated in the form of an arc concentric about the axis of rotation, to permit adjustment of the associated pin 242 in a circumferential direction. The bracket 234 includes a hub 248 and a radially extending disk 250, and each of the pins 242 extends through a hole 252 (Fig. 8) in the disk 250, the parts being so interfitted that the disc 250, and consequently the bracket 234, are free to slide back and forth on the shaft extension 232 and on the pins 242 while being rotated by the pulley 26.

The bracket 234 is provided with two diametrically opposed ears 254 extending from the disk 250 toward the pulley 26. At its distal end, each of the ears 254 is provided with an inclined camming surface 256, which is operably engaged by a cam roller 258, rotatably mounted on a supporting pin 260, rigidly and threadedly engaged with an arm 262 of the bracket 236 which, as already mentioned, is secured to the shaft extension 232. The direction of inclination of each of the camming surfaces 256 is such that it interconnects the distal end 264 of the associated ear 254 and the edge 266 of the ear that leads during rotation of the mechanism. Therefore, the engagement between the camming surfaces 256 and the cam rollers 258 is such that the bracket 236 and the shaft 214 to which the bracket 236 is secured are driven by the bracket 234, and consequently at the same speed as the tubular auxiliary drive shaft 18 so long as the bracket 234 remains at fixed distance from the pulley 26 (see Fig. 9). However, when the bracket 234 is slid toward the pulley 26, the inclined surfaces 256 cam the rollers 258 forward and thereby cause the shaft 218 to rotate more rapidly than the tubular shaft 18 so long as such motion of the bracket 234 toward the pulley 26 continues. Thus it may be seen that by sliding the bracket 234 toward the pulley 26, the inner shaft 218 and with it the knife adjusting gear 214 can be advanced with respect to the tubular shaft 18 and the head rotating gear 46 to attain outward, or expansion adjustment of the knives 170, as hereinabove explained.

Gauging means are provided for effecting such knife-opening movement of the bracket 234 in proportion to the diameter of an ear of corn approaching the cutter head 32. For this purpose a pair of opposed gauging fingers 270 (Figs. 2, 3 and 8) are arranged in horizontal alignment at opposite sides of the axis of rotation of the heads 32 and 34. As best shown in Figs. 2 and 3, the gauging fingers 270 operate between and in adjacency to the second pair of feed rollers 60, the ends of which are annularly relieved as indicated at 272 (Fig. 2) to provide operating space for the fingers 270. This relative positioning of the feed rollers 60 and the gauging fingers 270 permits both the rollers and the fingers to be mounted immediately adjacent the zone of operation of the cutting edges 181 of the corn cutting knives 170 (Fig 3), thus reducing to a minimum the distance that any portion of an ear of corn must travel after the diameter of that portion of the ear has been measured by the gauging fingers 270 and before encountering the cutting edges 181.

When the corn cutting machine is being used to process corn of the type characterized by kernels disposed in straight rows, the gauging fingers 270 employed are provided on their opposed corn engaging faces with horizontal, longitudinally extending ridges 274. These ridges are adapted to extend into spaces between, and to make sliding engagement with, rows of kernels of an ear of corn advancing through the cutter head 32. In this manner the gauging fingers 270 engage the ear of corn in a manner resembling a splined connection, thus cooperating with the rollers 60 in resisting any tendency for the ear of corn to be rotated about its longitudinal axis while being operated upon by the rotating knives 170.

Each of the gauging fingers 270 is carried by a supporting bracket 276, and since the fingers 270 are attached to their brackets 276 by machine screws 278 (Fig. 8), the gauging fingers 270 are readily removable to permit the substitution therefor, of gauging fingers whose corn-contacting faces are smooth in the event that corn of a type wherein the kernels are not disposed in straight rows, is to be processed.

Each of the gauging finger supporting brackets 276 is carried by a vertical shaft 280, 280a (Figs. 3 and 8) journalled in bosses 282 and 282a, respectively, formed on the transverse web 51 of the feed trough frame 52. The shafts 280 and 280a are arranged at opposite sides of an opening 284 in the web 51 through which the ears of corn pass when leaving the feed trough 49 and entering between the first pair of feed rollers 58. The shafts 280 and 280a are interconnected by equalizing sector gears 286 rigid therewith. The teeth 288 of these sector gears are enmeshed with each other thereby insuring coextensive rotation of the shafts 280 and 280a in opposite directions about their respective axes.

A shifting dog 290 extends radially from the shaft 280, to which it is rigidly secured by a block 292. A threaded pin 294 secures the block 292 rigidly to the shaft 280. The shifting dog 290 extends into an annular groove 296 (Figs. 4 and 8) between spaced flanges 298 carried by a sleeve 300 that is rigidly secured upon a reduced portion 302 of a push rod 304. A nut 306 and washer 308 rigidly secure the sleeve 300 in position on the push rod 304.

The push rod 304 is mounted in spaced, parallel relation to the shafts 18 and 218, and the end of the rod 304 carrying the sleeve 300 extends slidably through the transverse web 51 of the feed trough frame 52. Intermediate its ends, the push rod 304 extends slidably through a bracket 309 which is secured by a bolt 310 and nut 311 to a web 312 of the housing 14; and beyond the bracket 309, the threaded end 313 of the push rod 304 carries a radially extending arm 314 securely clamped in position by lock nuts 316.

A bolt 318 (Fig. 4) secures the inner race 319 of an anti-friction thrust bearing 320 to the outer end of the arm 314. The outer race 322 of the bearing 320 is seated within an annular groove 323 in the bore of the hub 248 of the bracket 234. Consequently, the anti-friction bearing 320 assists in rotatably supporting the bracket 234 and operates to slide the same axially on the shaft extension 232 in response to axial movement of the push rod 304.

A coil spring 324 encircling the push rod 304 and under compression between the bracket 309 and a collar 326 rigid with the push rod 304, continually urges the push rod 304 to the right as viewed in Fig. 4, and to the left as viewed in Fig. 8. Motion of the push rod 304 in the opposite direction, i. e., the direction in which the push rod 304 is moved when the gauging fingers 270 swing away from each other, is limited by the washer 308 which is of greater diameter than the hole in the web 51 through which the sleeve 300 extends.

*Operation*

Assuming the machine to be in operation and the main drive shaft 16 to be rotating in a clockwise direction as viewed in Fig. 1, the auxiliary drive shaft 18 is rotated in the same direction by the belt 22 and pulleys 24 and 26, thus causing the drive gears 46 and 47 to rotate counterclockwise as viewed in Fig. 8. The gears 46 and 47 drive the cutter head 32 and scraper head 34, respectively, at comparatively high speed, for example, 12 R. P. M.

All eight roller shafts 70 and 72 are driven by the main drive shaft 16, and thus effect rotation of the feed rollers 60, 62, 64 and 66. Ears of corn to be cut are placed by an operator in the trough 49, in which the ears are continuously fed axially toward the rapidly rotating cutter head 32 by the feed chain 53. Each ear of corn passes between cooperating rollers 58 which advance the ear to the rollers 60. These engage the ear and feed it axially into the cutter head 32 along the axis of rotation thereof.

As an ear of corn passes between the rollers 60, it likewise passes between the gauging fingers 270, spreading them apart and causing their respective shafts 280 and 280a to turn. As hereinabove explained, rotation of the shafts 280 and 280a in opposite directions is equalized by the sector gears 286, thus assuring that the ear of corn will not move horizontally out of axial alignment with the rotating cutter head 32; and since the upper and lower rollers of each pair 58, 60, 62 and 64 are likewise interconnected by equalizing arms 84 and 86 and the tooth and notch arrangement 104, each ear of corn will be prevented from moving vertically out of axial alignment with the cutter head.

As the shaft 280 turns in response to entry of an ear of corn between the gauging fingers 270, the shifting dog 290 is actuated to draw the push rod 304 to the right as viewed in Fig. 8, against the urgency of the coil spring 324. The extent of such motion is proportional to the diameter of the ear of corn passing between the gauging fingers 270.

Motion of the push rod 304 is transmitted to the bracket 234 by the radially extending arm 314, thus advancing the rotating bracket 234 and its ears 254 to the right as viewed in Fig. 8. This causes the inclined camming surfaces 256 to rotate the driven bracket 236 at a slightly increased speed, causing the inner shaft 218 to advance slightly with respect to the tubular drive shaft 18. In this manner the knife adjusting gear 214, which is rigidly secured to the inner shaft 218, is advanced slightly with respect to the cutter head driving gear 46, with the result that the knife adjusting gear 154 within the cutter head 32 is likewise advanced slightly with respect to the driven gear 146.

Since the adjusting ring 162 is rigid with the gear 154, while the annular plate 150 is rigid with the gear 146, such advance of the gear 154 with respect to the gear 146 causes the adjusting pins 184 to advance clockwise (Fig. 5) with respect to the stud pins 182, thus simultaneously pivoting all the knives clockwise (Fig. 5) about their respective stud pins 182, so that their inner blade carrying ends swing radially outward, iris fashion.

Thus it may be seen that as a consequence of the gauging fingers being spread apart by an ear of corn entering between them, the cutting edges 181 of the knives are disposed in a circle of larger diameter. The parts are so proportioned that the extent of the adjustment of the knives 170 so attained is proportional to the diameter of the ear of corn, so that regardless of the size of any ear fed into the machine, the whirling knives 170 are automatically adjusted by the ear itself, to the optimum position to cut the kernels therefrom.

The gauging fingers 270 impart to the gauging mechanism a higher degree of sensitivity than can be attained by the use of gauging rollers, which, being round, engage the ear of corn in a region which unavoidably is spaced from the knives by a distance at least as great as the radius of the rollers. The ends of the gauging fingers 270, being flat, make gauging engagement with the corn at a region significantly closer to the zone of operation of the knives, as can readily be appreciated by comparing the position of the distal ends of the gauging fingers 270 in Fig. 3, with the portion of the circumference of either of the rollers 60 which makes contact with an ear of corn gripped between the two rollers 60. Therefore, the flat-ended gauging fingers 270 are conducive to maximum accuracy in regard to depth of cutting, particularly when a short, relatively sharply tapered portion of an ear of corn is being cut.

When ears of corn are to be processed to produce whole kernel corn, the knives 170 should be set to cut the kernels from the ears only slightly above the cob line. On the other hand, if cream style corn is to be prepared, the knives 170 should be set to cut through the kernels at a greater distance from the cob line. In either case, the appropriate adjustment of the knives 170 may be attained by shifting the adjusting ring 162 on the gear 154 as hereinabove explained, by shifting the pins 242 within the arcuate slots 243, and/or by shifting the radial arm 314 axially on the rod 304 by suitable manipulation of the nuts 316.

After passing through the cutter head 32, each cob is passed on by the feed rollers 62 to and through the scraping head 34, which removes portions of the kernels remaining on the cob after passage through the cutter head, as explained in Patent No. 2,323,092, hereinbefore mentioned. As each cob emerges from the scraping head 34, it is gripped by the last pair of rollers 64, which advance the cob through the discharge outlet whence the cob drops into any suitable means (not shown) for disposing of the cobs.

The kernels or parts of kernels, as the case might be, which are severed from the cobs by the knives 170, are guided by the conical shielding plate and the partition 28 as they gravitate downward, to the discharge opening 15 (Fig. 3) through which they drop into a suitable conveyor (not shown) to be transported for further processing. The scrapings, i. e., kernel parts and corn milk, removed from the cobs during their passage through the scraping head 34, drop through the discharge opening 15a onto another conveyor (not shown) which conducts them to any desired point of discharge.

At all times during operation of the machine, centrifugal force acts on the counterweights 176, urging them to rotate their respectively associated knives 170 as nearly into their position of minimum opening as they are permitted to move by the gauging mechanism. Consequently, any lost motion that might otherwise be present in the driving connections between the knives 170 and the knife adjusting gear 214 is effectively taken up, making the knives 170 instantly and completely responsive to any rotational shifting of the inner shaft 218 within the tubular shaft 18.

The torsion spring 230 likewise functions to increase the sensitivity and responsiveness of the knife adjusting mechanism, by holding the follower rollers 258 against the camming surfaces 256. However, the maintenance of contact between the rollers 258 and the camming surfaces 256 is equally important when the machine is idle and the cutter head 32 is removed from the machine, because it assures retention of the knife adjusting gear 214 in proper position to be re-engaged by the gear 154 when the head 32 is replaced in the machine, and thus aids in assuring re-assembly with the knives 170 and the gauging fingers 270 in their proper relative positions.

Another function of the torsion spring 230 is to relieve pressure of the teeth of the gear 154 against the teeth of the gear 214, and thus avoid resistance to return of the knives 170 to their closed position by centrifugal force acting on the counterweights, promptly as each ear of corn completes its passage through the cutter head 32.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired, is:

1. A corn cutting machine comprising a rotatably mounted cutter head, a plurality of knives adjustably mounted thereon, a rotatably mounted tubular drive shaft, means connecting the cutter head to the drive shaft to be rotated thereby, a knife adjusting shaft rotatably mounted within the drive shaft, means connecting the knives to the adjusting shaft to be adjusted thereby relatively to the cutter head when the adjusting shaft is turned relatively to the drive shaft, means operably connected to the drive shaft for rotating the same, a first bracket rigid with the adjusting shaft, a second bracket connected to the drive shaft for rotation therewith, one of said brackets being movable axially of the shafts toward and away from the other bracket, and means interconnecting the brackets for rotating the adjusting shaft and including adjustable means for rotationally adjusting the adjusting shaft within the drive shaft in response to axial movement to said second bracket.

2. A corn cutting machine comprising a rotatably mounted cutter head, a plurality of knives mounted on the cutter head for movement toward and away from the axis of rotation thereof, a rotatably mounted drive shaft, means connecting the cutter head to the drive shaft to be rotated thereby, an inner shaft rotatably mounted within the drive shaft, means connecting the knives to the inner shaft to be adjusted thereby relatively to the cutter head when the inner shaft is turned relatively to the drive shaft, means operably connected to the drive shaft for rotating the same, and means connecting the inner shaft to the drive shaft to be driven thereby including a bracket connected to the drive shaft to be rotated thereby, a second bracket, means connecting the inner shaft to said second bracket to be rotated thereby, one of said brackets being axially movable toward and away from the other bracket, and cooperating camming means interposed between said brackets and establishing a driving connection therebetween, said camming means being operative in response to relative axial movement of the brackets for rotationally adjusting the inner shaft with respect to the drive shaft.

3. A corn cutting machine comprising a rotary knife carrier, a plurality of knives adjustably mounted on the carrier, a drive shaft rotatably mounted adjacent the carrier, means operably connecting the carrier to the drive shaft, a knife adjusting shaft rotatably mounted in axial alignment with the drive shaft, means connecting the knives to the knife adjusting shaft to be adjusted thereby relatively to the carrier when the knife adjusting shaft is turned relatively to the drive shaft, a bracket rigid with the knife adjusting shaft, a second bracket rotatably and slidably mounted on the knife adjusting shaft, a pin rigid with the drive shaft and slidably engaging said second bracket, means on one of the brackets providing a camming surface radially offset from and disposed obliquely to the axis of the shafts and a cam follower carried by the other bracket in operative engagement with the camming surface to effect rotational adjustment of the knife adjusting shaft relatively to the drive shaft in response to axial movement of said second bracket.

4. A corn cutting machine comprising a rotatably mounted cutter head, a plurality of knives adjustably mounted on the cutter head, a rotatably mounted hollow drive shaft, means connecting the cutter head to the drive shaft to be rotated thereby, an inner shaft rotatably mounted within the drive shaft, means connecting the knives to the inner shaft to be adjusted thereby relatively to the cutter head when the inner shaft is turned relatively to the drive shaft, means operatively connected to the drive shaft for rotating the same, a bracket rigid with the inner shaft, a second bracket rotatably and slidably mounted on a portion of the inner shaft extending beyond an end of the drive shaft, a pin rigid with the drive shaft and slidably engaging said second bracket, means on one of the brackets providing a camming surface radially offset from and disposed obliquely to the axis of the shafts, a cam follower carried by the other bracket in operative engagement with the camming surface to effect rotational adjustment of the inner shaft within the drive shaft in response to axial movement of said second bracket, and a spring interposed between the shafts and continuously pressing the cam follower into engagement with the camming surface.

5. An adjusting mechanism for a corn cutter including a cutter head mounted for rotation about a central axis, a corn cutting knife carried by the cutter head and movable thereon toward and away from said axis, a rotatably mounted tubular drive shaft, means connecting the cutter head to the drive shaft to be rotated thereby, and means mounted adjacent the cutter head for advancing an ear of corn endwise along said axis to present the ear to the knife, said adjusting mechanism comprising an inner shaft rotatable within the drive shaft, means operably connecting the knife to the inner shaft to be adjusted on the cutter head in response to rotational adjustment of the inner shaft with respect to the drive shaft, a bracket rigid with the inner shaft, a second bracket rotatable and axially slidable on the inner shaft, means connecting the second bracket to the drive shaft to be rotated thereby, means including a cam on one of the brackets and a cam follower on the other bracket for driving the inning shaft from the drive shaft and for rotationally adjusting the shafts with respect to each other in response to axial movement of said second bracket, and means for gauging the ear of corn as the same advances along said axis and for correspondingly axially shifting said second bracket to effect adjustment of the knife proportionally with actuation of the gauging means by the ear of corn.

6. An adjusting mechanism for a corn cutter including a rotatably mounted cutter head, a tubular drive shaft, means connecting the cutter head to the drive shaft to be rotated thereby, a circular series of corn cutting knives mounted on the cutter head for rotation therewith and for adjustment relatively to the cutter head, and means mounted adjacent the cutter head for feeding an ear of corn endwise through the circle described by the knives, said adjusting mechanism comprising an inner shaft rotatable within the tubular shaft, means connecting the knives to the inner shaft to be thereby adjusted relatively to the cutter head in response to rotational adjustment of the shafts with respect to each other, a bracket associated with each of said shafts, means connecting each bracket to its associated shaft for rotation therewith, one of the brackets being axially movable toward and away from the other bracket, means interconnecting the brackets and operable during rotation of the shafts for advancing one shaft with respect to the other shaft as the axially movable bracket alters its distance from the other bracket, and means for gauging an ear of corn as the ear is advanced by the feeding means and for axially moving said axially movable brackets proportionally with the extent of actuation of the gauging means.

7. A corn cutter comprising a knife carrier, a corn cutting knife adjustably mounted on the carrier, means mounted adjacent the carrier for feeding to the knife and along a predetermined path an ear of corn to be cut, means operatively connected to the carrier and the feeding means for moving them relatively to each other to cause the knife to cut the corn, guide rollers rotatably mounted adjacent the carrier at opposite sides of said path in position to engage and guide an ear of corn advancing along said path, a gauging finger mounted for movement in a plane transverse to said path and intersecting said guide rollers, and means operative in response to movement of the finger for adjusting the knife on the carrier.

8. A corn cutter comprising a knife carrier, a corn cutting knife adjustably mounted on the carrier, means mounted adjacent the carrier for feeding to the knife an ear of corn to be cut, means operatively associated with the carrier and the feeding means for moving them relatively to each other to cause the knife to cut the corn, opposed guide rollers rotatably mounted adjacent the carrier in position to engage and guide an ear of corn as the same is advanced by the feeding means, each of said rollers being concave to restrain an ear of corn engaged between the rollers against lateral movement with respect thereto, opposed gauging fingers mounted for movement in a plane intersecting the rollers and normal to the path of an ear of corn being advanced by the feeding means, and means operative in response to movement of the gauging fingers for adjusting said corn cutting knife on the carrier.

9. A corn cutter comprising a knife carrier, a corn cutting knife adjustably mounted on the carrier, means mounted adjacent the carrier for feeding to the knife an ear of corn to be cut, means operatively connected to the carrier and the feeding means for moving them relatively to each other to cause the knife to cut the corn, guide rollers rotatably mounted adjacent the carrier in position to engage and guide an ear of corn being advanced by the feeding means, each of said rollers being concave to restrain an ear of corn engaged between the rollers against lateral movement with respect thereto, gauging fingers mounted for movement toward and away from the path of an ear of corn engaged by the rollers and in a plane intersecting the rollers and normal to said path, equalizing means interconnecting the gauging fingers for coextensive movement in opposite directions, and means operable by the gauging fingers in moving toward and away from said path for moving the knife on the carrier.

References Cited in the file of this patent

UNITED STATES PATENTS

| | | |
|---|---|---|
| 2,017,931 | Wheeler | Oct. 22, 1935 |
| 2,212,071 | Morral et al. | Aug. 20, 1940 |
| 2,214,285 | Schmidt | Sept. 10, 1940 |
| 2,323,092 | Kerr | June 29, 1943 |
| 2,335,594 | Kerr | Nov. 30, 1943 |
| 2,386,955 | Kerr | Oct. 16, 1945 |
| 2,577,530 | Kerr | Dec. 4, 1951 |

U. S. DEPARTMENT OF COMMERCE
PATENT OFFICE

CERTIFICATE OF CORRECTION

Patent No. 2,787,273            April 2, 1957

Charles E. Kerr

It is hereby certified that error appears in the printed specification of the above numbered patent requiring correction and that the said Letters Patent should read as corrected below.

Column 3, line 65, for "oppoiste" read -- opposite --; column 4, line 61, for "with in" read -- within --; line 64, for "tto" read -- to --; column 6, line 24, after "is" insert -- the --; line 49, for "conductive" read -- conducive --; line 60, for "thub 240" read -- hub 240 --; column 8, line 67, for "12 R. P. M." read -- 1200 R. P. M. --; column 12, line 19, for "inning" read -- inner --.

Signed and sealed this 11th day of March 1958.

(SEAL)
Attest:
KARL H. AXLINE

Attesting Officer

ROBERT C. WATSON
Commissioner of Patents